(12) United States Patent
Matsumoto et al.

(10) Patent No.: US 7,195,170 B2
(45) Date of Patent: Mar. 27, 2007

(54) POST-BIT: MULTIMEDIA EPAPER STICKIES

(75) Inventors: Takashi Matsumoto, Tokyo (JP); Maribeth Back, Berkeley, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/149,000

(22) Filed: Jun. 9, 2005

(65) Prior Publication Data
US 2006/0278692 A1 Dec. 14, 2006

(51) Int. Cl.
*G06K 7/10* (2006.01)
(52) U.S. Cl. .................. 235/472.01; 715/700
(58) Field of Classification Search ........ 235/472.01–472.03; 715/769, 702
See application file for complete search history.

(56) References Cited

U.S. PATENT DOCUMENTS

| | | | |
|---|---|---|---|
| 6,133,898 A | 10/2000 | Ludolph et al. | 345/115 |
| 6,243,075 B1 | 6/2001 | Fishkin et al. | 345/156 |
| 2002/0114350 A1* | 8/2002 | Tang et al. | 370/469 |
| 2004/0029569 A1* | 2/2004 | Khan et al. | 455/414.1 |

OTHER PUBLICATIONS

Bridgestone news release, QR-LPD®http://www.bridgestone.co.jp/english/news/041029.html.
Fishkin, K.P., Gujar, A., Harrison, B.L., Moran, T.P., Want, R. *Embodied User Interfaces for Really Direct Manipulation*. Communications of the ACM, Sep. 2000, pp. 74-80.
Gorbet, M.G., Orth, M. and Ishii, H., Triangles: Tangible Interface for Manipulation and Exploration of Digital Information Topography, Proc. OfChI'98 (1998), ACM Press, 49-56.
Harrison, B.L., Fishkin, K., Gujar, A., Mochon, C. and Want, R, The Design and Use of Squeezable Computers: An Exploration of Manipulative User Interfaces, Proc. Of CHI'98 (1998), ACM Press.
Helin, F, Hoglund, T. Zackaroff, R. Hakansson, M., Ljungblad, S. & Holmquist, E. L. Supporting Collaborative Scheduling with Interactive Pushpins and Networking Surfaces, Adjunct Proceedings of Uhicomp 2004 (2004).
Ishii, H., U., Tangible Bits: Towards Seamless Interfaces Between People, Bits and Atoms, CHI 97 (1997), 22-27.
Ljungstrand, P, Redstorm, J and Holmquist, E.L. WebStickers: Using Physical Tokens to Access, Manage and Share Bookmarks to the Web, DARE'2000 (2000), ACM Press.
Moran, T.P., Saund E., Melle, W.V., Gujar, A. U., Fishkin, K.P., and Harrison, B.L.: Design and Technology for Collaborage: Collaborative Collages of information on Physical Walls. Proceedings of UIST '99 (Asheville, North Carolina), Nov. 7-11, 1999, pp. 197-206.
Nelson, L., Ichimura, S., Pedersen, E., and Adams, L., Patette: A Paper Interface for Giving Presentations, CHI '99 (1999), ACM Press, 354-361.

(Continued)

*Primary Examiner*—Michael G. Lee
*Assistant Examiner*—Kristy A. Haupt
(74) *Attorney, Agent, or Firm*—Fliesler Meyer LLP

(57) ABSTRACT

The present invention relates to a device and methods for storing, sorting, sharing and communicating information with a device, which uses a tangible real-world user interface. In an embodiment of the invention, the device is intended to facilitate communication of information through intuitive operations and commands.

23 Claims, 13 Drawing Sheets

OTHER PUBLICATIONS

Rekimoto, J., Pick-and-Drop: A Direct Manipulation Technique for Multiple Computer Environments, UIST'97 (1997), 31-39.

C. Schwesig., I. Poupyrev., E. Mori; Gummi: A Bendable Computer, CHI Apr. 24-29, 2004; vol. 6, No. 1, pp. 263-270.

Weiser, M. and Brown, J.S.: The Coming Age of Calm Technology, http://www.ubiq.com/hypertext/weiser/acmfuture2endnote.htm.

J. Ueda., T. Matsumoto., N. Okude., Cubic Display Device "Z-agon"—The Movie to Design Z-agon with Scenario-.

J. Rekimoto, Multiple-Computer User Interfaces: "Beyond the Desktop" Direct Manipulation Environments Interaction Laboratory, Sony Computer Science Laboratories, Inc. Tokyo 141-0022 Japan E-Mail: rekimoto@acm.org, http://www.csl.sony.co.jp/person/rekimoto.html.

M. Omata., K. Go., A. Imamiya., A Gesture-Based Interface for Seamless Communication between Real and Virtual Worlds; CNR-IROE, Florence, Italy Oct. 25-26, 2000; 6$^{th}$ ERCIM Workshop "User Interfaces for All" Long Paper.

Barragan, H., Network/Serial port interface, http://people.interaction-ivrea.it/h.barragan/flashserialinterface.html.

Fishkin, K.P., "A Taxonomy for and Analysis of Tangible Interfaces", Journal of Personal and Ubiquitous Computing, 8(5), Sep. 2004, pp. 347-358 © Springer-Verlag.

Henderson, Jr. D.A., and Stuart K. Card: Rooms: The Use of Multiple Virtual Workspaces to Reduce Space Contention in a Window-Based Graphical User Interface, ACM Transactions on Graphics, vol. 5, No. 3, Jul. 1986, ACM Press, 211-243.

Ichimura, S., Nelson, L.and Pedersen, E., Card Gear: A Presentation System Manipulated with Paper Cards, Interaction 2000, Information Processing Society of Japan, 17-24.

Kuwakubo, R., bit-man, http://www.vector-scan.com/.

MacIntyre, B., Mynatt, E.D., Vioda, S., Hansen, K.M., Tullio, J., Corso, G.M., Support for Multitasking and Background Awareness Using Interactive Peripheral Displays, In Proceedings of ACM UIST'01 Symposium on User Interface Software and Technology (Orlando, Florida, USA, Nov. 11-14), ACM Press, 41-50.

Paul, K., Wong, W.S., Chabinye, M., Salleo, A., Ready, S.E., Apte, R.B. and Street, R.A. Printed Polymer Transistor Arrays for Displays and Imaging. Second Advanced Technology Workshop on Printing an Intelligent Future: Printed Organic and Molecular Electronic Technologies (IMAPS 2003); Mar. 16-19, 2003; Boston, MA; USA.

Zenithal Bistable Displays, http://www.zbddisplays.com/.

Ikeda, Y. Sato, K., Kimura, A., Tool Device: Handy Haptic Feedback Devices Imitating Every Day Tools, HCI International 203, pp. 661-665 (2003), www-inolab.sys.es.osaka-u.ac.jp/_users/asa/text/publist/publist_e.html.

* cited by examiner

POST-BIT: MULTIMEDIA EPAPER STICKIES

BACKGROUND OF THE INVENTION

1. Field of the Invention

The present invention relates to a device and methods for storing, sorting, sharing and otherwise communicating information with a device, which uses a tangible real-world user interface when handling the information to facilitate the ease of communication.

2. Description of the Related Art

Post-it® the adhesive note has become ubiquitous in the workplace and home. They are generally used to remind or label an item for the writer and/or another person or else to help one or more persons sort information such as when brain storming. In other words, they are used to store information (reminder function), share information (communication function) and sort information (brain storming, labeling functions). These functions are enabled and enriched by its tangible properties as a small, adhesive, writable piece of paper.

Researchers have also shown how paper-based information arrangement methods can be connected to computer systems to augment scheduling tasks. One advantage of the paper-based arrangement method is that larger physical spaces are more effective than personal computer (PC) monitor or display screens from an organizational standpoint. A collaborage or collaborative collage of physically represented information on a surface that is connected with electronic information combines the advantage of physical space with computer record keeping. A paper-based, sticky-back memo system has also been designed for collaboration in physical space, especially on walls.

A number of flexible or squeezable computers have also been designed with embedded physical manipulations to control functions. These computers use sensors to scroll through or view a larger virtual space. Movement of the display is mapped to corresponding movements in the virtual space, such as changes to the view perspective or to the degree of magnification. The Gummi prototype designed by Schwesig et al., "Gummi: A Bendable Computer", *CHI* 2004, vol. 6(1), pp. 263–270, April 2004. allows simple browsing operations by bending the 2D position control. Harrison et al., "The Design and Use of Squeezable Computers: An Exploration of Manipulative User Interfaces", *CHI* 1998, pp. 17–24, April 1998. describe a tactile interface embedded within a handheld device to input control commands such as flick on the upper right corner, turning the device, downward finger pressure, short directional stroke, tilt the device and grasp with thumb and finger. However, these devices do not incorporate flexible displays as an integral part of the technology.

Peripheral awareness, is also a feature that has been embodied in calm technology where background awareness assists in the development of the interactive peripheral display system. Further, the concept of integrating the physical body of a device with the virtual contents inside and the graphical display of the content has also been developed. A manipulable user interface has been used as a means of instructing a device as taught in U.S. Pat. No. 6,243,075. These inventors showed that interfaces could be designed based on physical manipulations.

Some electronic-Paper (e-Paper) technology products are currently commercially available. Fuji Xerox introduced photo-addressable e-Paper. E-ink introduced card size e-Paper. Flexible Transparent Organic Light Emitting Display (TOLED) and Philips' flexible Liquid Crystal Display (LCD) can also serve as multimedia playback units in small sizes. Currently, e-Paper has not been used as a video medium. However, recently Philips achieved switching speeds capable of supporting video. Bridgestone has also introduced a Quick Response Liquid Powder Display (QR-LPD)® that has video capability and a memory function so that the image is retained after the power has been turned off. Bi-stable Display manufactured by ZBD has also succeeded in putting a memory function into a Light Emitting Display (LED) screen. PARC is developing another potentially applicable technology in flexible transistor arrays. Several of these technologies may make it possible to contain electric circuits in a flexible display device.

Many display technologies are competing in the field. Important new developments have been made in the fields of memory function and flexibility of the display. Flexibility enables an independent interface for displays, while advances in memory function allow the display to retain information without power.

The "Drop-Beyond-Drag" function draws inspiration both from the "Pick-and-Drop" concept proposed by Rekimoto, J., Pick-and-Drop: A Direct Manipulation Technique for Multiple Computer Environments, *UIST* '97, pp. 31–39, 1997 and the Apple Computer Inc., Cupertino, Calif., "Dock" icon. There also exist earlier described graspable and manipulable devices. The "Flex-and-Rub" functions have been separately investigated in Gummi and other flexible computers. The "Sort-and-Edit" function is related to a number of approaches including position aware e-Paper, and Palette, a paper system operated by tangible manipulation for giving presentations. A number of recent applications use a similar approach for managing asymmetrical mapping of interfaces to contents.

SUMMARY OF THE INVENTION

Post-Bit can be a small e-Paper device for handling multimedia content, combining interaction control and display into one package. A Post-Bit is, as the name indicates, modeled after paper Post-It®. Post-Bits can download and show multimedia content via a tangible display and are also controllable via embedded sensors mounted behind the e-Paper. Tangible properties of paper such as flipping, flexing, scattering and rubbing are mapped to controlling aspects of the content. In addition to these operations it is envisaged that smelling, hearing, speaking, touching, pressing, sliding, flipping, flexing, squeezing and rubbing can be used to interact with and/or operate Post-Bit. This allows interaction with the multimedia content such as speeding up or slowing down frames, or rearranging them by restacking several Post-Bits in a different sequence.

Because the standard Graphical User Interface (GUI) remains a primary method of authoring and managing multimedia, in one embodiment of this invention, a method of connection and communication can be needed between Post-Bits and the host computer GUI. In one embodiment of this invention, the method of connection can be through the Post-Bit Base, a thin physical accessory containing an integrated circuit with data connections and a power supply. In one embodiment of this invention, a Post-Bit Base mounted on a PC display frame enables a user to "Drag-and-Drop" files from the computer to the Post-Bit. This function is referred to as Drop-beyond-Drag, directly from the GUI window onto the Post-Bit. In one embodiment of this invention, information from the Post-Bit can be transferred from the Post-Bit to the computer via a squeezing action, rather like squeezing a ketchup packet. Both data transfers are supported by animated feedback. Post-Bit not only communicates information, it can connect a Tangible User Interface (TUI) or physical "real-world" items and the GUI or digital world.

In one embodiment of the invention, the Post-Bit system includes a small Post-Bit Binder, which allows a collection of Post-Bits to be stacked in sequence, for connecting to a PC and uploading appropriate sequential material. Since the Post-Bits are e-Paper, they retain an image of a key frame or indexed contents, even when un-powered.

The Post-It® concept enhances peripheral awareness in physical surroundings. Post-Bit takes this notion further, and introduces an interface embodied as a physical object with tangible interfaces in the work place and workspace.

BRIEF DESCRIPTION OF THE DRAWINGS

Preferred embodiments of the present invention will be described in detail based on the following figures, wherein.

DETAILED DESCRIPTION OF THE INVENTION 1.1 Post-Bit Player

In one embodiment of the invention, Post-Bit can be a device which facilitates the ease of communication of information having at least one sensor for receiving the information, a module for providing or transmitting information, a processor for controlling the sensor and the module, wherein the module uses 'tangible real world representations' either alone or in conjunction with a graphical user interface to communicate with the user(s). The act of pressing on a 'tangible real world representation' in the invention can be contrasted with the act of pressing a button in a currently available GUI. In the latter case the button is linked to an arrow, which acts as a metaphor in the GUI. In contrast, in the Post-Bit, there is no link to a metaphor; you are touching a 'tangible real world representation' to which the device responds.

In another embodiment, the processor can determine the proximity of the device relative to another device to which it can receive or transmit information. In various embodiments of the invention, the sensors, which are physically embedded in the device, can be visual, auditory, odorous, tactile and/or kinesthetic. In various embodiments of the invention, the module for providing or transmitting information comprises a user interface driver and user interface the latter being physically embedded in the device and can be a visual, auditory, odorous, tactile and/or kinesthetic interface.

Figure 1:
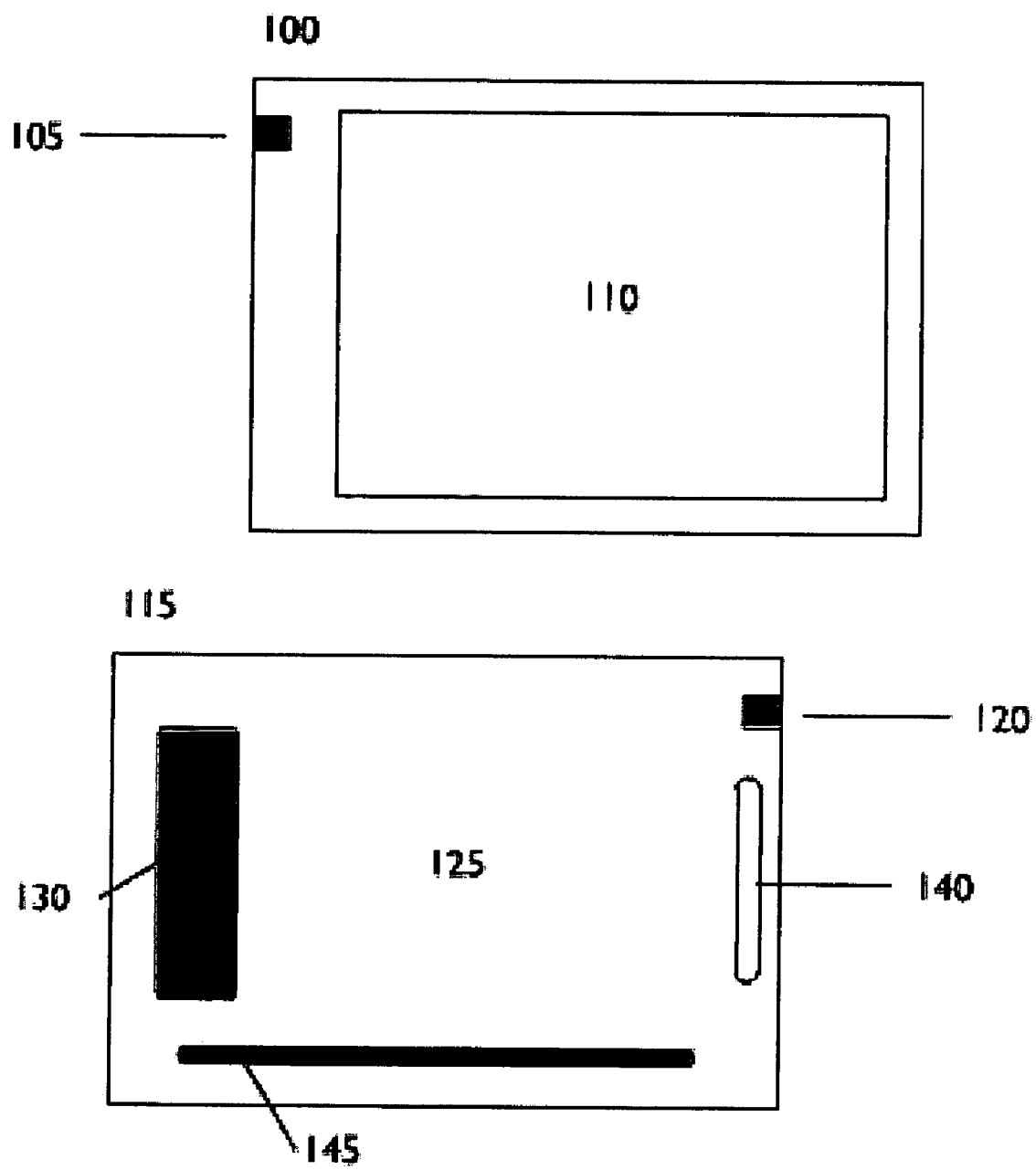
FIG. 1 shows components of the front and back side of a Post-Bit.

In one embodiment of the invention, the device can be an e-Paper device measuring about 2 inches by 4.5 inches, where the whole device can be pliable or the display can be flexible, about the thickness and stiffness of a paperback cover. In another embodiment of the invention, Post-Bit has a detachable bond on its back for random placement mounting, mechanically mimicking the sticky back of Post-It®. FIG. 1 shows an embodiment of the Post-Bit front (100) and back (115) sides, comprising a terminal (front 105), (back 120) which allows the Post-Bit to connect to a Post-Bit Binder or Base, a flexible e-paper display (110) with embedded flexible circuit (125), embedded touch slide sensor (130), embedded flexible sensor (145) and means to affix Post-Bit to a surface (140).

In one embodiment of the invention, the module for providing or transmitting information comprises a display (visual) interface, where behind the display, a flexible (resistive bend) sensor and a touch slide sensor are placed for easy operation using a finger pad control. In another embodiment of the invention, data collected from the sensors can be used to step through multimedia contents. In this manner, the device can present data to a viewer. In a further embodiment of the invention the Post-Bit device is able to upload or download data from a PC or other analog or integrated circuit devices such as phones, Personal Digital Assistant (PDA), pager, music player, audio-responsive sensing device, video player, light-responsive detecting device, odor-releasing device, odor-sensing device, sensation- or movement-producing device and kinesthetic or tactile sensing device. In the embodiment where the Post-Bit is communicating with another device, the Post-Bit can be placed within about $3\times10^{-1}$ meter of a fixed location corresponding to the other device in order for the communication to occur. In another embodiment, the Post-Bit can be placed within about $3\times10^{-2}$ meter of a fixed location corresponding to the other device in order for the communication to occur. In another embodiment of the invention, Post-Bit utilizes a battery, a tilt sensor, a micro-controller, a tact switch, and a display driver.

1.2 Post-Bit Base (Data and Power Connections)

In one embodiment of the invention, the Post-Bit Base can be the data and power port that allows communication with a host computer. In this manner the device can present data to a computer. In an embodiment of the invention, the connection between one or more Post-Bits and a Post-Bit Base can be established through surface contact. In another embodiment of the invention, the connection can be wireless. In the embodiment where the communication is wireless, one embodiment requires that the Post-Bit is placed within about 12 inches of the Post-Bit Base in order for the communication to occur. Another embodiment of the invention requires that the Post-Bit can be placed within 1 inch of the Post-Bit Base in order for the communication to occur.

In an embodiment of the invention, the Post-Bit has a battery as a source of energy and the connection between the Post-Bit and the Post-Bit Base is made using induction both to pass data and to charge the Post-Bit battery. In another embodiment of the invention, to enable a user's physical arrangement or sequence of Post-Bits to be recognized by a device to which the Post-Bit Base is communicating, the data and power supply base can be embedded into or affixed to several places in the workspace environment In an embodiment of the invention, the system knows the location of each Post-Bit at all times. In another embodiment of the invention users choose ad hoc physical placements to suit their own mental maps: for example, keeping the "To Do Today" list on the desk to my left, where the docking of the Post-Bit to the Base indicates the position.

Figure 2:
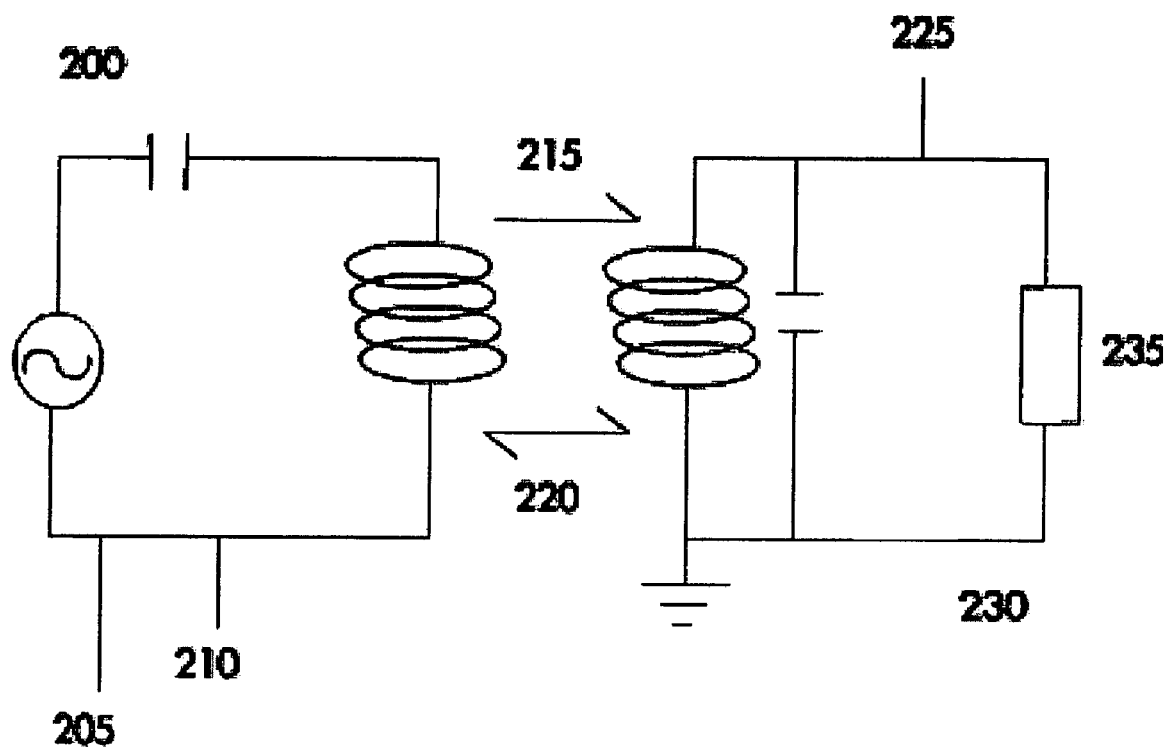
FIG. 2 illustrates a circuit diagram for the Post-Bit on a Post-Bit Base.

In one embodiment of the invention, the Post-Bit Base incorporates a combination of power supply, data communication protocol and identification (ID) innovative technologies. In an embodiment of the invention, Post-Bit incorporates a contact-free power supply consisting of a thin film shaped to cover physical surfaces. In another embodiment of the invention, magnetic or metal Velcro data plus power systems are utilized. In one embodiment of the invention, a data communications protocol can be used to deliver content and sensor information. In an embodiment of the invention, an ID technology such as RFID or an onboard ID system can be used. In another embodiment of the invention, the Post-Bit Base has an embedded coordinate grid and each Post-Bit has a unique onboard ID. Thus, in one embodiment of the invention, the system can recognize location of a Post-Bit on a Base. In another embodiment of the invention, the Post-Bit Base can also be used for other mobile devices, for example, to synchronize calendars on mobile devices while they recharge on the Base. FIG. 2 shows one embodiment for a circuit diagram showing the Post-Bit Base (200) and the Post-Bit (230) comprising place ID (static) (205), active data I/O (210, 225), power supply (215), data communication (220) and post bit load with Post-Bit ID (static) (235).

1.3 Post-Bit Binder

Figure 3:
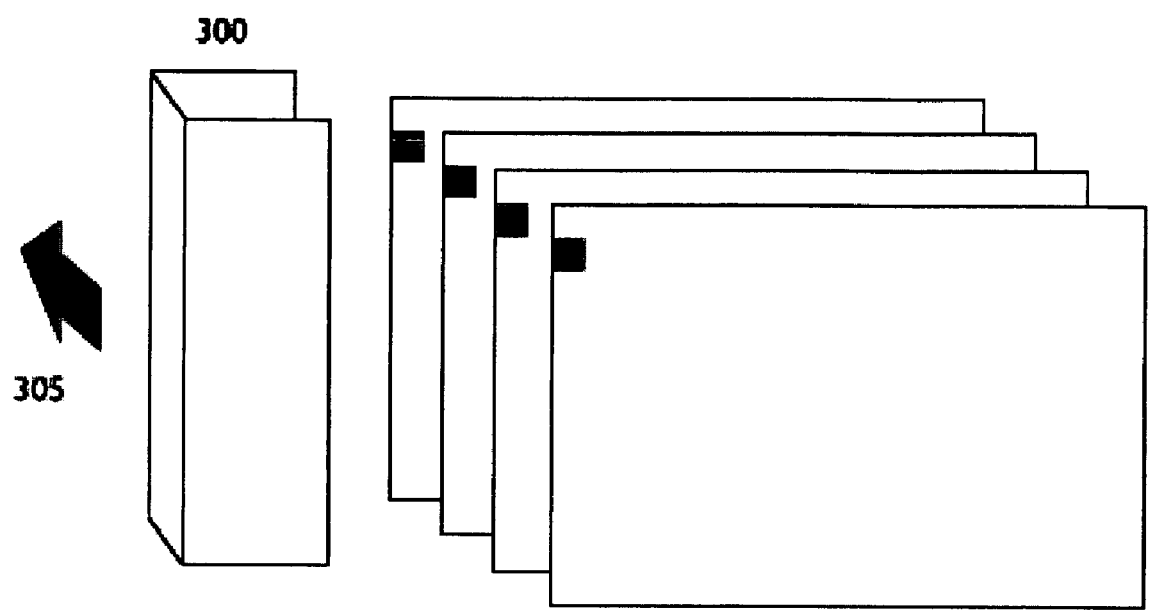
FIG. 3 illustrates a set of Post-Bits and a Post-Bit Binder.

In one embodiment of the invention, the Post-Bit Binder can be a small container in which a few Post-Bits can be inserted. FIG. 3 illustrates a sketch of four Post-Bits being inserted in a Post-Bit Binder (300) being connected to a PC display frame (305). In another embodiment of the invention, the Post-Bit Binder connects to the Post-Bit Base in a manner similar to the Post-Bits themselves. In one embodiment of the invention, on the edge that fits into the Post-Bit Binder, a Post-Bit has embedded terminals that are used to download data from a PC or other analog or integrated circuit devices such as phones, PDA, pager, music player, audio-responsive sensing device, video player, light-responsive detecting device, odor-releasing device, odor-sensing device, sensation or movement producing device and kinesthetic or tactile sensing device. In an embodiment of the invention, electromagnetic contact-free or inductive terminals are used to transfer data to and from Post-Bit via the Post-Bit Binder.

In one embodiment of the invention, one terminal of the Post-Bit Binder can be an interface to connect a Post-Bit to a PC display frame. In an embodiment of the invention, other terminals are pass-through connectors for another Post-Bit in the Post-Bit Binder stack, where the Post-Bit Binder works regardless of the number of Post-Bits inserted into the Binder. In another embodiment of the invention, the Post-Bit Binder keeps the connections aligned properly, serves as primary connector to the PC display frame, and serves as an easily handled physical container for a pack of Post-Bits. In one embodiment of the invention, the Binder itself has an e-Paper cover that displays either metadata information about its contents, the sequence of the Post-Bits inserted into the Binder or simply mirrors the still contents of the top Post-Bit in the stack.

2.1. Post-Bit Base on a PC Display Frame

Figure 4:
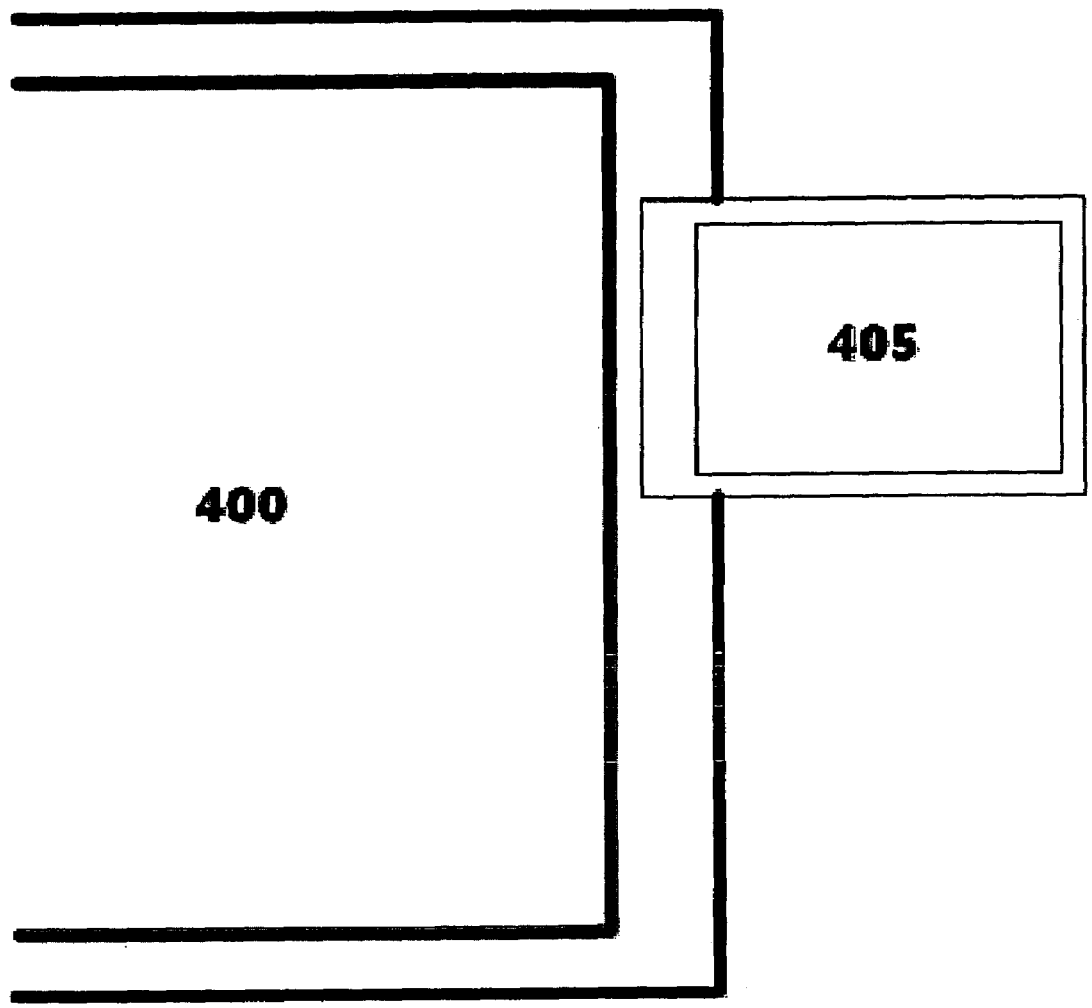
FIG. 4 illustrates the Post-Bit inserted in a Base mounted on a PC Display.

In one embodiment of the invention, the host computer's display frame can be the primary location for the Post-Bit Base interface. FIG. 4 illustrates a sketch of the PC display (400) where a Post-Bit (405) is mounted on the PC display frame. In another embodiment of the invention, Post-Bits applied to the Post-Bit Base are recognized and their location computed to enable the functions connected with the "Drag-and-Drop" and Squeeze actions and the associated animations. In this manner the device is able to present data to other devices. Location information can be important to cope with the asymmetry problem discussed in the Drop-beyond-Drag section.

2.2. Post-Bit Base Pad

Figure 5:
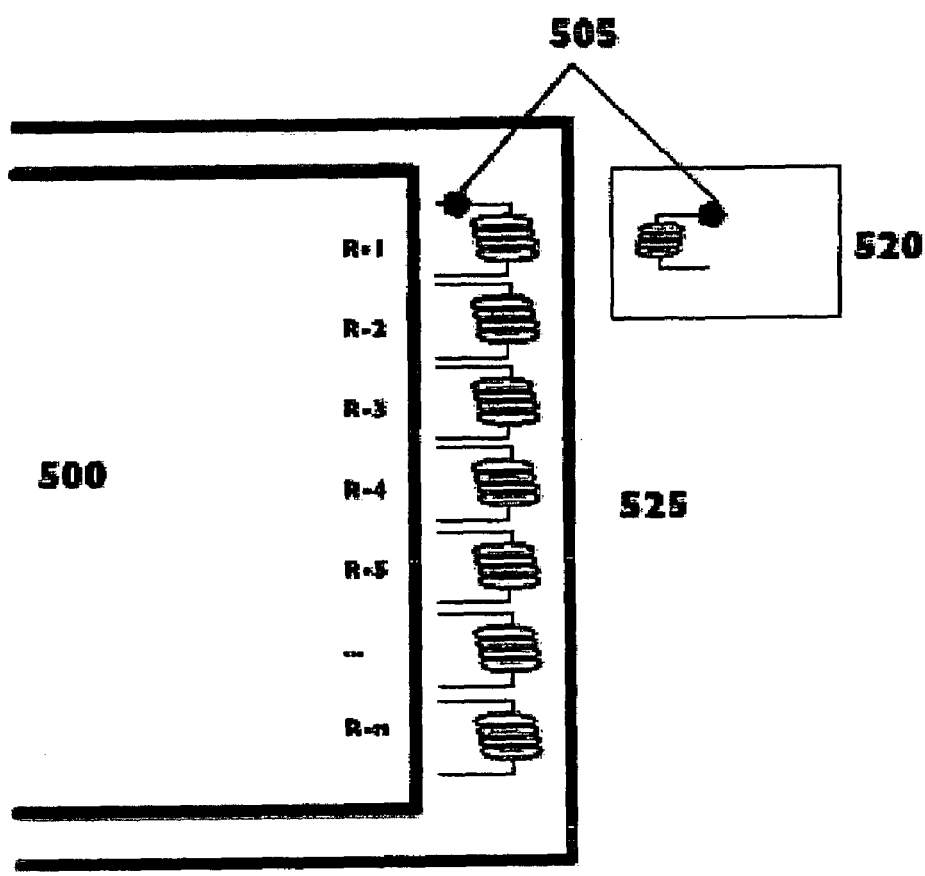
FIG. 5 illustrates PC detection of Post-Bit Bases mounted on a PC Display.

In one embodiment of the invention, Post-Bit Base Pads are designed to be placed on desks, tables, shelves, or other surfaces. In an embodiment of the invention, the small Base Pad can be used as a "hot spot" for recharging the Post-Bits, where the user simply sets a Post-Bit on the Pad Base to wake it up or to recharge a depleted battery. In one embodiment of the invention, large Base Pads, covering tabletops, are used for more complex operations, such as a longer or continuous task of Post-Bit sorting. The large Base Pad can also capture the order or physical arrangement of the Post-Bits as they lie on the larger surface. Here order can indicate a spatial arrangement or grouping of the Post-Bits not equivalent with sequence. The large Base Pad is one means for the relative spatial position of each Post-Bit device to be determined. FIG. 5 illustrates a sketch of the PC display (500) where a Post-Bit (520) is mounted on the PC display frame location where the ID (505) is detected by one of several readers (525) (R-n, n=1, 2, 3, . . . ).

2.3 Public Post-Bit Base

In one embodiment of the invention, the Post-Bit Base can be hung on the wall billboard-style. In another embodiment of the invention, the Post-Bit Base can be designed for social and public applications: connecting to friends, public billboards, web sites, and so on via a network. Users set tasks (e.g. "connect to Billboard Base Pad A", "send this to friend B") and create or load the contents of the Post-Bit from other Post-Bits on the Public Base. Since, in one embodiment of the invention, a Post-Bit has a display on the device, it can show information and allow a user to arrange this information dynamically.

3. Post-Bit software

In one embodiment of the invention, Post-Bit software correlates activities between the host computer, the Post-Bits, the Post-Bit Binders and Bases. These activities include file transfer, location detection, serial connection establishment, and interface animation or representation to portray the state or activities of the Post-Bit system. In an embodiment of the invention, an authoring and data management system specific to the Post-Bit media form (e.g., appropriate chunking of video segments) can be included in the software. In another embodiment of the invention, Macromedia Flash with a serial connection can be used to accomplish these functions.

4. Prototype

A simple electronic prototype of Post-Bits was designed to test the interaction design and embedded sensor operation, using an LCD character display instead of e-Paper. An Atmel AT90S4433 microcontroller drives the LCD screen and also handles digital and analog input/output. The sensors currently include a button to enable electronic docking, a resistive bend sensor to change the information speed (e.g. frame rate), and a slider that scrolls contents back and forward. Although a resistive sensor is used in the prototype, piezo sensors are also a possibility, as are other sensor types like capacitive sensors and pressure address carpets.

The prototype is mounted to the PC display with Velcro. Two metal contacts are embedded in the Velcro to provide the serial connection to the computer. Serial cables are connected to a PC via a RS232C interface tip. Using a virtual desktop built with Flash animation, each object on the desktop can talk to the Post-Bit using a Network/Serial Port Interface.

Figure 6:
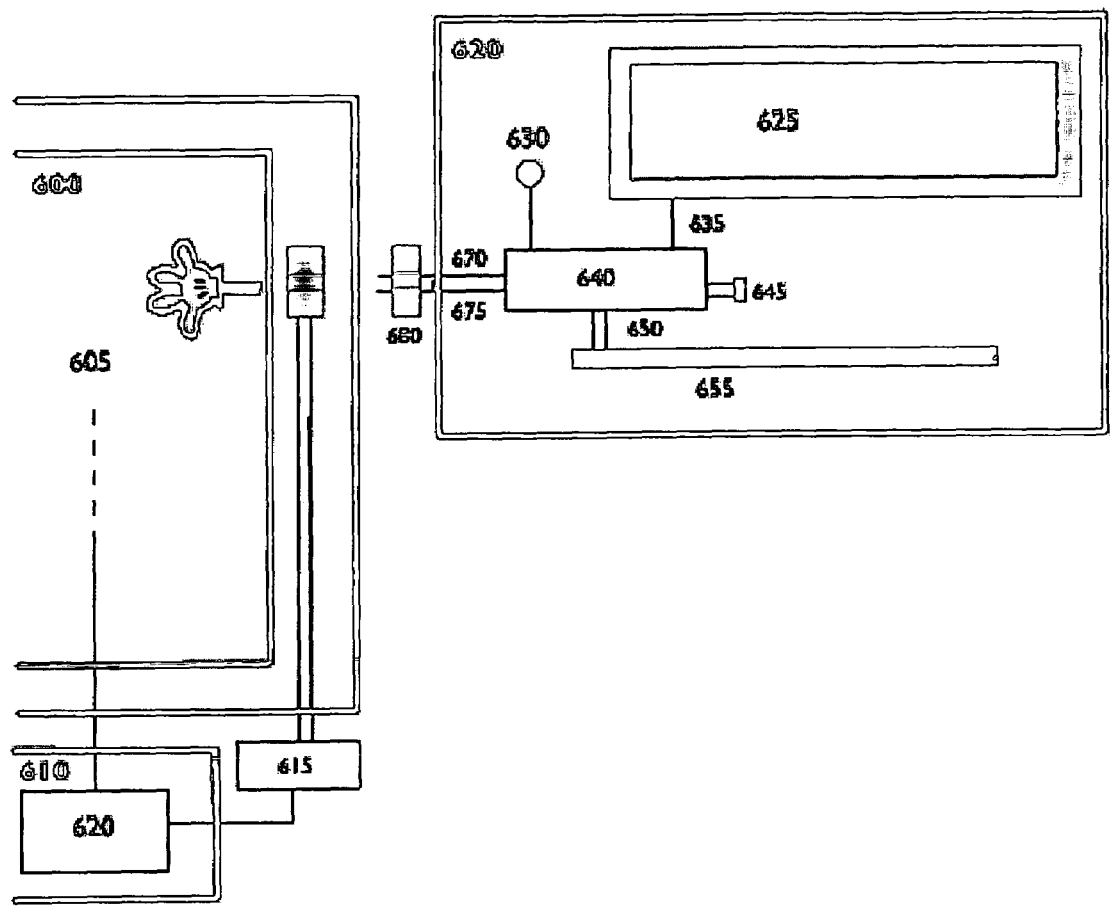
FIG. 6 shows the circuit diagram of the LCD Post-Bit prototype interacting with a PC.

In the prototype, when the "Drag-and-Drop" function is used with a file on the desktop into the Post-Bit on the edge, the desktop shows a "hand-grabbing" icon and transports text contents to a serial port. The prototype gets and draws a text line on the LCD module via serial terminals embedded in the Velcro. The prototype continues to show the text on the LCD even after the Post-Bit prototype is detached from the PC display frame. The prototype has a flex sensor that will control the display contents, and a small tact switch to trigger the "Squeeze It" effect for downloading data from the Post-Bit to a PC or other device. FIG. 6 shows a PC (610), a server (620), and a PC display (600) showing the flash animation "hand-grabbing" icon (605) generated through ADM3202 (615) by a Post-Bit prototype (620) mounted on the frame of the PC display comprising a character LCD (625), a tact switch (630), an AT90S4433 chip (640), XTAL (645), analog I/O (650), a flex sensor (655), TXD (670), RXD (675) and Velcro adhesive (680).

The observation that people tend to put a paper Post-It® on the PC display frame, was the basis for locating Post-Bit on the PC display frame when it is connected to a PC. This provides some unique interface features using Post-Bit to extend the edge of the PC display (described herein as Drop-beyond-Drag and Squeeze It functions).

A Post-Bit is intended to be mounted anywhere around the frame of the display, both on the right and the left hand side of the PC display, thereby solving the problem of left- or right-handedness of the user. However, this introduces asymmetry to the device. In addition, when a Post-Bit is located on the edge of the display screen, there is inherent left-right asymmetry. Further, because one edge of the backside of the Post-Bit has adhesive and connectors and the other side has a slider sensor, there is additional asymmetry. To solve these asymmetry problems, a tilt switch was added as a third sensor to the Post-Bit. Thus the tilt sensor enables the Post-Bit device to determine the upward gravitational direction. This is one means for the direction of orientation of the Post-Bit device to be determined. This sensor allows Post-Bit to manage these asymmetry problems, for example, ensuring that text or video content appears right side up even if the Post-Bit is turned upside down. The Post-Bit system uses the tilt sensor to address asymmetry caused both by handedness and by the double edges of the display.

The following examples of 'tangible real world' representations to facilitate ease of communication are intended only to be illustrative and the invention is by no means limited to these specific embodiments:

"Drop-Beyond-Drag": Getting Data from the GUI to the Post-Bit

Figure 7:
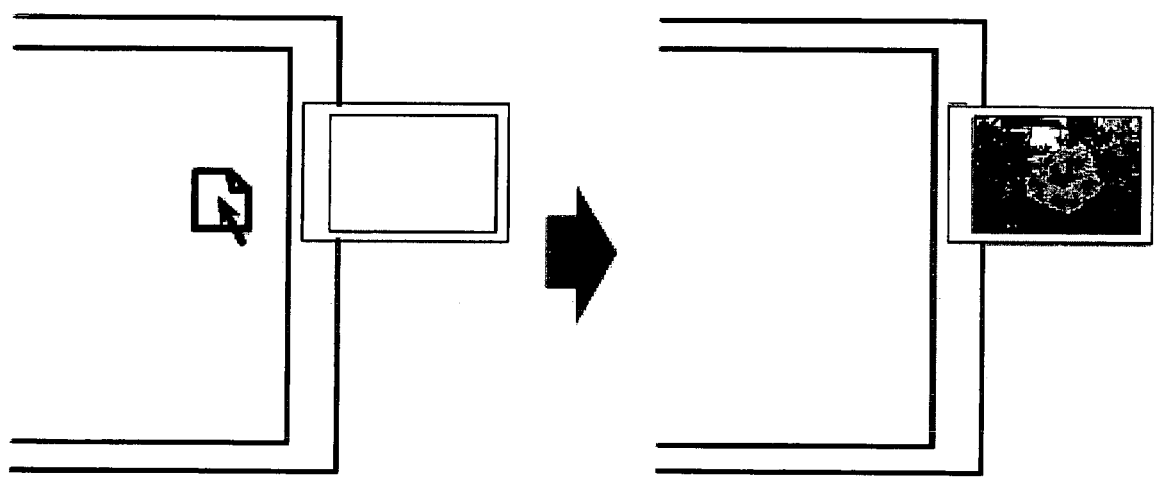
FIG. 7 illustrates "Drop-Beyond-Drag" concept of transferring a picture to a Post-Bit mounted on a Base.

Drop-beyond-Drag is a function for copying contents from a device (PC, PDA, phone) to Post-Bits. In one embodiment of the invention, when a Post-Bit is placed on the frame of the PC display, it can act as an extension of the main display. A user drags and drops the file from a PC display directly to a Post-Bit. If the driver is not available or enabled to allow the file transfer, then Drop-beyond-Drag comes into play. The Post-Bit lights up to acknowledge that the mouse is in the vicinity of the Post-Bit, and shows key information such as a title, an icon and a key frame. FIG. 7 illustrates "Drop-Beyond-Drag" concept.

Figure 8:
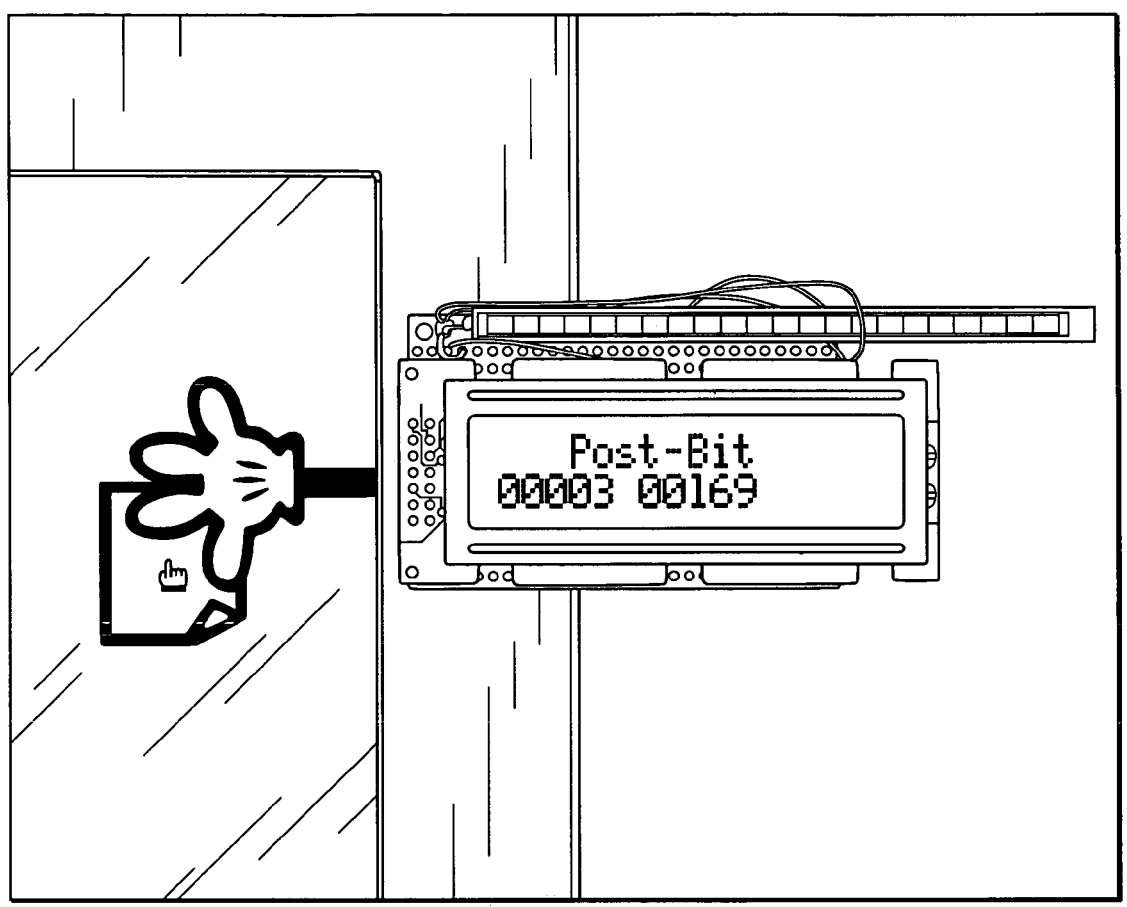
FIG. 8 shows the prototype where a "Drop-Beyond-Drag" function is occurring and the "hand-grabbing" icon is shown on the PC monitor.

This is a similar concept to "Pick-and-Drop". However, the Post-Bit directory transports the files without disengaging from the device and the Post-Bit shows the contents being transferred, which is more intuitive.

Where the GUI displayed on the PC display and the physical Post-Bit intersect, a visual icon or animation lets the user know that the Post-Bit has acquired the data. For example, in one embodiment, when the dragged item comes close to the mounted Post-Bit, a hand icon appears and "grabs" the tile. Though this action is somewhat like Apple's "Dock" icons, the metaphor in this case is attached to the physical object outside the GUI frame of reference, i.e., the Post-Bit. The animation shows data acquisition by "reaching" out onto the GUI to grab the data, and appearing to drag it back onto the Post-Bit. FIG. 8 shows the "hand-grabbing" icon displayed when the prototype Post-Bit performs the "Drop-Beyond-Drag" function.

Squeeze It: Getting Data from the Post-Bit to the GUI

Figure 9:
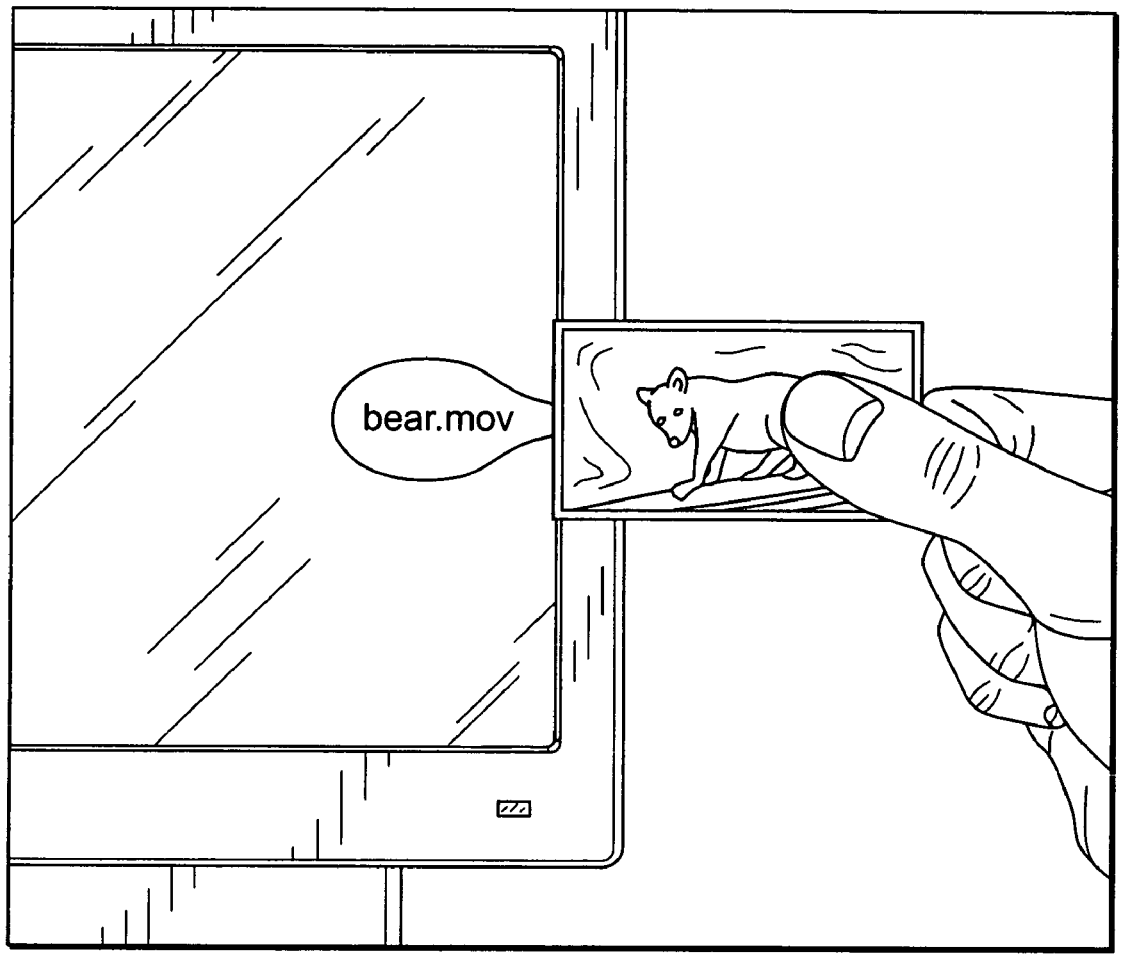
FIG. 9 illustrates the "Squeeze-it" function as denoted by the Ketchup packet icon.

Getting data from the host computer's GUI onto the Post-Bit is a simple extension of the GUI metaphor, which is both useful and intuitive. Getting data from the Post-Bit back onto the main screen, however, does not have such an obvious mapping. In one embodiment of the invention, the "Squeeze It" function uses a "ketchup packet" metaphor to depict this function. FIG. 9 shows an illustration of the ketchup packet "Squeeze It" metaphor. Putting a Post-Bit on the display frame and applying pressure to the end of the Post-Bit triggers a sensor-activated data transfer back into the GUI environment—rather like squeezing ketchup from a packet onto a dish. In our prototype, a tact switch set between the Post-Bit prototype display and the circuit board is used to effect the "Squeeze It" function. Using a variable force sensor instead of a switch would give a more realistic splash animation related to the amount of force applied.

"Flip-and-Find": Stack Manipulation

Figure 10:
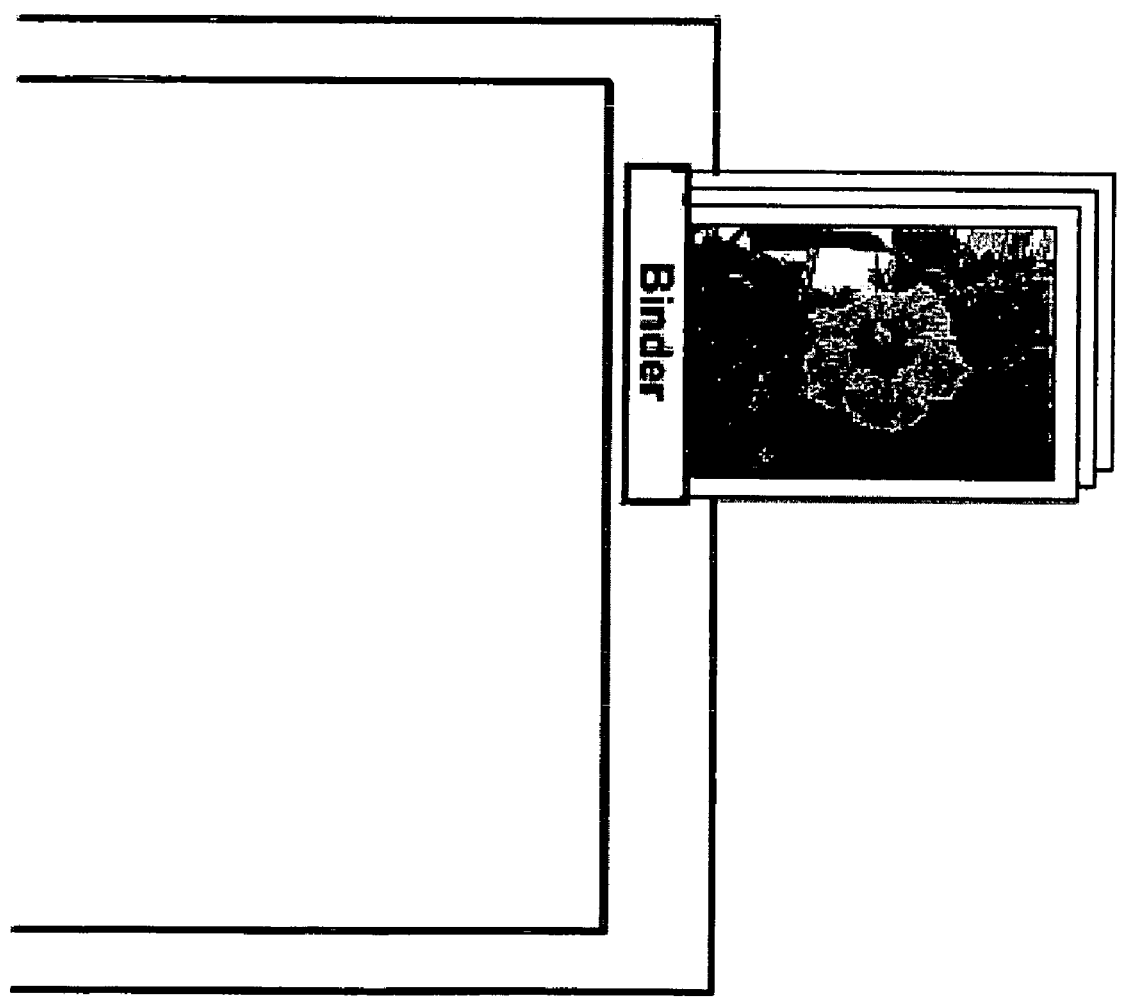
FIG. 10 shows a Post-Bit located in a Binder.

This function enables the finding of a target content file from multimedia files. In one embodiment of the invention, when movie data is copied (e.g., using "Drop Beyond-Drag") to a stack of Post-Bits, each e-Paper Post-Bit shows a key frame of the movie contents. Users can then flip through the Post-Bits to search the key frames (or presentation slides, or any set of sequential or non-sequential data). Then, when moving contents from a stack of Post-Bits to the desktop (e.g., using the "Squeeze It" function applied to a stack of Post-Bits), one file is created combining all the selected scenes in the sequence of the sorted Post-Bits. FIG. 10 illustrates how a Post-Bit Binder shows a key frame of an individual scene when a set of Post-Bits are located in the Binder.

Pick and Play

A loaded Post-Bit acts like a static note or label when it is posted somewhere (the e-Paper does not require power to show a visual image of the data). In one embodiment of the invention, when the Post-Bit is picked up, it becomes active as a multimedia player.

Flex and Rub

Figure 11:
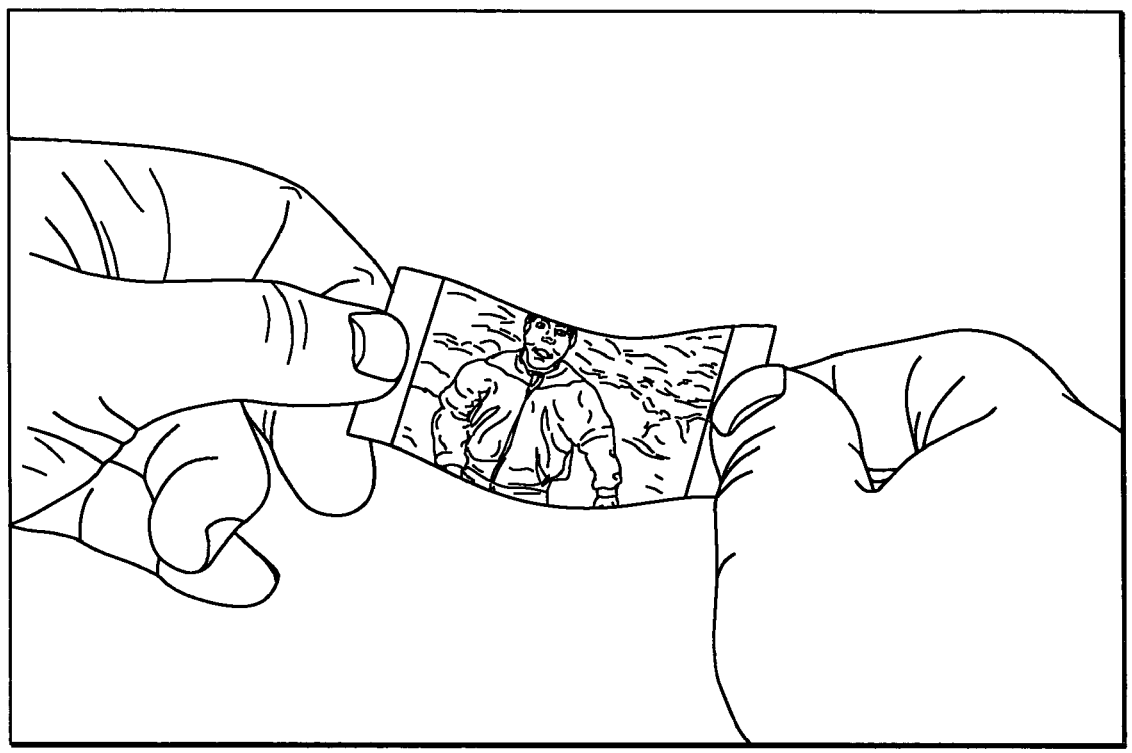
FIG. 11 illustrates the flex and touch sensor operations when a Post-Bit displays a video clip.

Each Post-Bit can show video or other sequential image or text message. In one embodiment of the invention, easy to use and intuitive motions control the content: [a slider sensor] for fast-forwarding or reversing the image is mounted along one edge of the Post-Bit back side. Bending the Post-Bit warps the [flex sensor], which speeds or slows the frame rate of the contents. This allows careful inspection or speedy cruising through any section of the Post-Bit file's content. It also provides a quick glimpse of content when the user flips through several Post-Bits in quick succession. In one embodiment of the invention, Post-Bits, combine display, viewing control and tactile interface into one unit embedded in a flexible device. FIG. 11 shows an illustration of the flexing operation of the Post-Bit.

Sort and Edit

Figure 12:
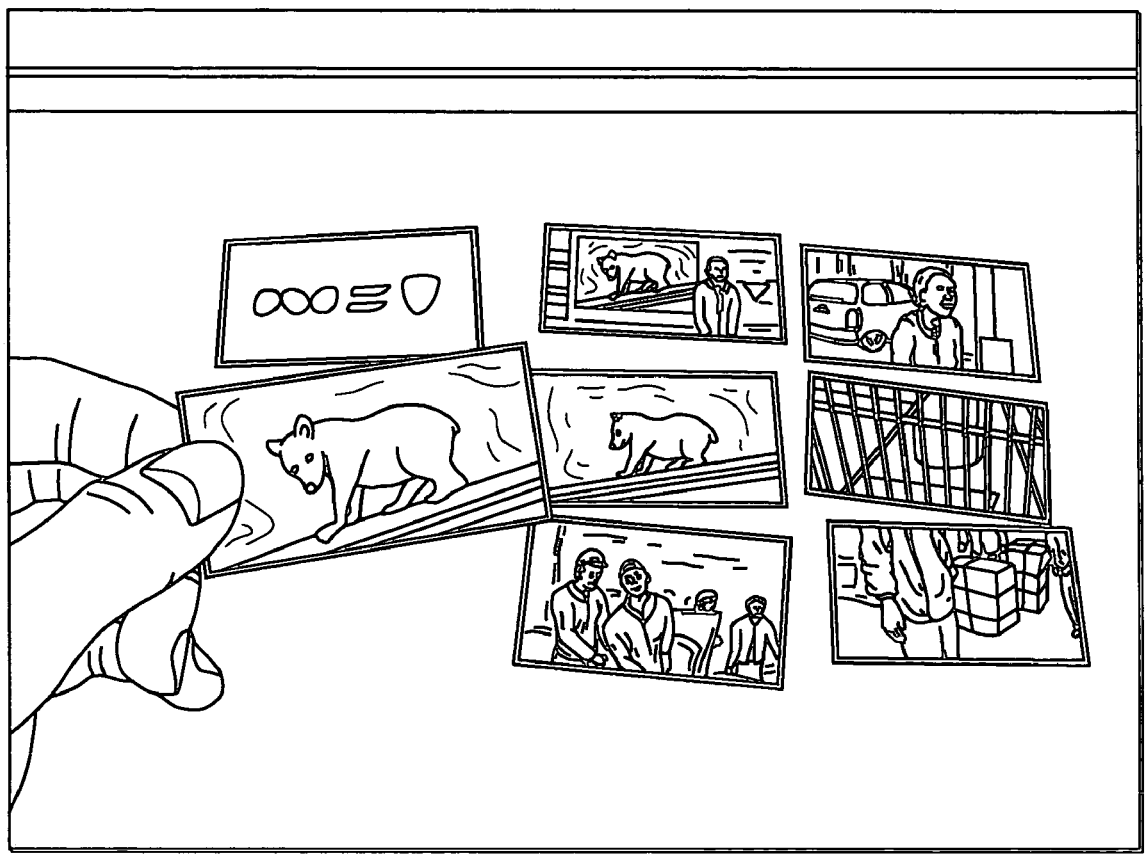
FIG. 12 illustrates using Post-Bit to choose a scene from a video.

Sort and Edit leverages the tangible nature of Post-Bit representation of a data file in familiar sorting or editing operations. In one embodiment of the invention, this function enables the user to sort multimedia contents that are randomly laid out on a physical desktop (e.g., one covered with a Post-Bit Base Pad), by sorting the Post-Bits that contain the video. Post-Bits enable the tangible manipulation of visual contents of files. This function can also be used to edit a video scene-by-scene, or to sort through presentation slides. FIG. 12 shows an illustration of the "Sort-and-Edit" function.

Software Prototype Combining Functions: "Sort-and-Edit"+ "Pick-and-Play"

Figure 13:
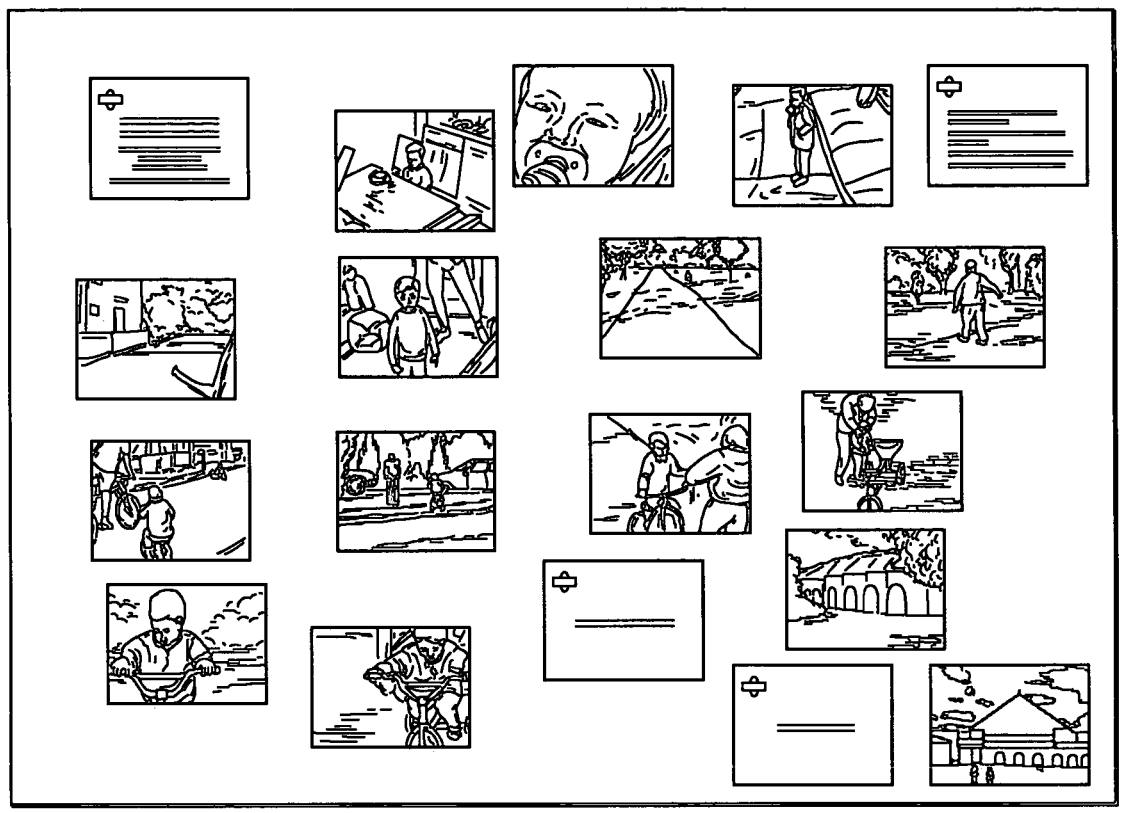
FIG. 13 illustrates using Post-Bit for a "Sort-and-Edit" operation, wherein a Flash prototype is used to sort nineteen key frames from a home video distributed across a Post-Bit Base Pad surface.

FIG. 13 illustrates using Post-Bit for a "Sort-and-Edit" operation, wherein a Flash prototype is used to sort nineteen key frames from a home video distributed across a Post-Bit Base Pad surface. In one embodiment of the invention, the Base surface recognizes the location of each individual Post-Bit and can use that information to determine an order for the Post-Bits or otherwise edit the video stream. Using the Pick and Play function, each Post-Bit plays a portion of the movie when it is picked up. This prototype allows people to associate a still key frame with a portion of the video more easily. Users can refresh their memory of what portion of the video the key frame represents just by picking up the Post-Bit. The important thing in automatic video editing systems is choosing recognizable scenes and key frames when the movie video is divided into Post-Bits. The proposed Post-Bit software enables these tasks.

5.1 Example Scenario #1

Joel has a huge collection of movies, TV programs, cell phone movies, downloaded videos and meeting videos filmed by web cameras. As Joel has several large hard disks, he has recorded all the Olympic games. Joel's friend Peter, a Judo buff, didn't go to the Olympics or see the broadcast transmission or record the transmission. But now Peter wants to watch the Judo matches, so he asks Joel to give him a copy. Joel connects the Post-Bit Binder to his computer and "Drag-and-Drops" the Olympics file onto the Post-Bits. Each Post-Bit shows a different segment of the Games. He flips through the Post-Bits, and picks out the Judo matches that Peter wants to watch. He puts these Post-Bits in a Post-Bits Binder and leaves it on Peter's desk.

As soon as Peter goes back to his desk, he finds the Post-Bits and the Binder. He deals them out onto his desk, and then picks up the ones he wants to watch, in sequence. As he picks up each one, the judo video is played. As Peter flexed the Post-Bit, the video speeds up or slows down, according to his interest. He rubs the Post-Bit's back to replay, so as to see a particularly fancy judo move. He watches it again and again, till the battery wears down. He sticks the Post-Bit, along with some other favorite scenes, on a Post-Bit Base on a nearby wall to recharge the batteries. But he has one video Post-Bit he really wants to watch now. He puts the Post-Bit on the PC display frame and squeezes the Post-Bit. The video is copied into his PC and an icon is created on the desktop; he clicks the icon to watch the video on his PC.

Having gone through all the Post-Bits he got from Joel, Peter is now collecting and editing Judo games. He' has copied some old Olympic games he already had on his PC back onto Post-Bits, and again, he deals them out on his desk. He compares some scenes and picks up some great games. He combines them in a Binder to get a particular sequence of the best moves and most famous scenes, making a special "Peter's Judo Mix." video.

5.2 Example Scenario #2

David's got a meeting in five minutes, and just enough time to copy the documents he needs for the meeting. But just as he finishes making the copies, the machine alerts him that it needs a toner replacement. David feels torn: he can't be late for his meeting, but he also wants to warn the next person who comes along. He records a message movie on his cell phone: "Hi, the copy machine needs replacement toner, but I can't do it now . . . " He "Drop-Beyond-Drags" the movie message onto a Post-Bit and sticks the message on top of the copy machine.

Bob walks by and sees the Post-Bit on the copy machine. When he picks it up, it plays David's message, so Bob decides to replace the toner.

This is Bob's first time at changing the toner. He opens up the copier machine and discovers three Post-Bits that reside there labeled "Change Toner," Paper Jam," and "Customer Center." He picks up "Change Toner" and the Post-Bit comes to life showing animated directions instructing him as to the whereabouts of the company's toner stock. The cartridges are kept on the top shelf behind the stock room door, which he finds easily with the Post-Bit directions, map and/or video.

Bob grabs a toner cartridge and heads back to the copy machine. Next, the Post-Bit tells him to open cover No. 5. Under cover No. 5 is another Post-Bit, which when activated shows a video manual with step-by-step illustrations on removing and replacing the toner cartridge. Following the detailed on-the-spot instructions, Bob gets the toner replaced with no trouble.

The following examples of 'tangible real world' functions are intended only to be illustrative and the invention is by no means limited to these specific embodiments.

6. Functions 6.1. "Drop-Beyond-Drag"

Small e-Paper storage extends the PC screen. In one embodiment of the invention, the user can "Drag-and-Drop" a file beyond the PC display frame. Using a stack of Post-Bits, one file can be addressed on one e-Paper with immediate, one-to-one physical correspondence.

6.2. Grabbing-Hand Icon on GUI for "Drop-Beyond-Drag"

In one embodiment of the invention, when the Post-Bit is mounted on the PC display frame, the Post-Bit reaches out a "hand" icon and grabs a file present on the PC display desktop when that file is dragged close to the Post-Bit location.

6.3. Squeeze Interface: Ketchup Packet Metaphor of Tangible, Real-World Oriented Interface.

Real-World Oriented Interface is used to move data from Post-Bit to GUI desktop. In one embodiment of the invention, Post-Bit located on the edge of the PC display frame, downloads the data to the desktop and the icon using the metaphor of a ketchup packet being squeezed to accompany the data transfer.

6.4. Combination of "Drop-Beyond-Drag" and Squeeze Interface:

To seamlessly connect GUI and TUI operations, a Post-Bit located near the edge of the PC display will allow data to be transferred between GUI and Real Object Post-Bit. In one embodiment of the invention, this operation is GUI based and uses the GUI hand icon ("Drop-Beyond-Drag") to transport data to the Post-Bit. In the opposite direction, the Real-World oriented "Squeeze It" interface is used to transfer data from the Post-Bit to the desktop screen. An animated icon supports the file or data transfer.

6.5. Copy Content into a Stack of Post-Bits

In one embodiment of the invention, to examine a multi-window or otherwise complicated task, the contents of the task are copied to a stack, one at a time, and then transferred to a Post-Bit which shows one window or one part of the task.

6.6. "Pick and Play"

In one embodiment of the invention, a Post-Bit will display a key frame or scene without power. Thus a Post-Bit left sitting or otherwise inactive can be programmed to display a static image, which allows it to serve as a post-it like notification. But when it is picked up, it animates and, for example, becomes a video player.

6.7. "Flex-and-Rub" Interface

The Post-Bit controllers are intuitive. In one embodiment of the invention, by flexing Post-Bit between fingers, a video is activated to begin playing. In another embodiment of the invention, rubbing Post-Bit speeds up the frame-per second rate of the video. Users will naturally learn as they play with a Post-Bit. In a further embodiment of the invention, the problem of asymmetry is solved with a tilt sensor, rendering the video display in the correct orientation.

6.8. Binder Flip Interface

In one embodiment of the invention, to find a particular image when sorting through a video, simply convert the video to Post-Bits and then each Post-Bit in a stack shows a key frame. The user can flip through the Post-Bits to find the image.

6.9. Video divided into segments on Post-Bits

In one embodiment of the invention, Post-Bit pages are loaded sequentially with key frames but can be taken out of the binder and rearranged. In this way the video can be rearranged.

6.10. Sorting Media Such as PowerPoint

In one embodiment of the invention, each Post-Bit shows movie content or key frames. A user can sort or otherwise rearrange the sequence of Post-Bits and then reassemble from the Post-Bits to a PC to generate the final movie or presentation.

7. Software

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which is a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

What is claimed is:

1. A hand held device facilitating ease of communication of information external of itself, which comprises:
    (a) at least one sensor for receiving the information;
    (b) a module for providing the information;
    (c) at least one processor for controlling feedback from the at least one sensor and/or changes in the module; and
    (d) wherein a visual tangible real-world representation is displayed to facilitate the ease of communication of the information, where the information is a single file and there is one to one correspondence between the tangible real world representation and the file.

2. The device of claim 1, wherein the at least one processor and the module and/or the at least one sensors are configured to perform the following steps:
    (e) determine a proximity of the device relative to another device; and (f) determine whether the device will receive and/or transmit information to another device based on the proximity.

3. The device of claim 1, wherein the at least one sensors are physically embedded into the device and are selected from the group consisting of visual, auditory, odorous, tactile and kinesthetic.

4. The device of claim 1, wherein the module for providing the information comprises:
  (g) at least one user interface driver, and
  (h) at least one user interface for providing the information, wherein the user interface is physically embedded into the device and is selected from the group consisting of visual, auditory, odorous, tactile and kinesthetic.

5. The device of claim 1, further comprising at least one source of energy for powering the device.

6. The device of claim 1, wherein the processor and the module and/or the at least one sensors are configured to determine the direction of orientation of the device relative to gravity.

7. The device of claim 1, wherein the processor and the module and/or the at least one sensors are configured to receive information about tangible operations which the device is sensing selected from the group consisting of smelling hearing, speaking, touching, pressing, sliding, flipping, squeezing, moving, dropping and rubbing.

8. The device of claim 7, wherein a tilt sensor is used to determine the direction of orientation of the device relative to gravity.

9. The device of claim 1, wherein the body of the device is pliable.

10. The device of claim 9, wherein the processor and the module and/or the at least one sensors are configured to receive information about tangible operations which the device is sensing selected from the group consisting of smelling, hearing, speaking, touching, pressing, sliding, flipping, flexing, squeezing, moving, dropping and rubbing.

11. The device of claim 1, wherein the processor and the module and/or the at least one sensors are configured to determine information about the device selected from the group consisting of proximity, spatial position, direction of orientation, sequence and order relative to another device.

12. The device of claim 1, wherein the processor and the module and/or the at least one sensors are configured to receive information about other devices selected from the group consisting of proximity, spatial position, direction of orientation, sequence and order.

13. The device of claim 1, wherein the device communicates with another device selected from the group consisting of a like device, analog circuit device, integrated circuit device, personal computer, computer, phone, Personal Digital Assistant (PDA), pager, music player, audio-responsive sensing device, video player, light-responsive detecting device, odor-releasing device, odor-sensing device, sensation/movement-producing device and kinesthetic/tactile-sensing device.

14. The device of claim 1, wherein the communication of information is restricted to a device that is within about $3 \times 10^{-1}$ meter of a fixed location corresponding to another device.

15. A hand held device facilitating ease of communication of information external of itself, which comprises:
  (a) at least one sensor for receiving the information;
  (b) a module for providing the information;
  (c) at least one processor for controlling feedback from the at least one sensor and/or changes in the module;
  (d) wherein the module uses tangible real-world representations to facilitate the ease of communication of the information;
  (e) at least one source of energy for powering the device; and
  (f) a base, wherein the base recharges the source of energy, wherein the base allows the device to receive and/or transfer information with another device, wherein the base allows a sequence of the device relative to other devices to be determined; and wherein the base allows the order of the device relative to other devices to be determined.

16. A hand held device facilitating ease of communication of information external of itself, which comprises:
  (a) at least one sensor for receiving the information;
  (b) a module for providing the information;
  (c) at least one processor for controlling feedback from the at least one sensor and/or changes in the module;
  (d) wherein the module uses tangible real-world representations to facilitate the ease of communication of the information;
  (e) at least one source of energy for powering the device; and
  (f) a binder, wherein the binder is used to transport more than one device and wherein the binder establishes the sequence of devices inserted into the binder.

17. A handheld device for facilitating ease of communication of information with a second device, which comprises:
  (a) a pliable body containing one or more sensors embedded into the body selected from the set of: a tilt sensor, a tact switch, a flex sensor and a slider;
  (b) at least one display driver,
  (c) at least one display physically embedded into the body adapted for displaying information;
  (d) a battery physically embedded into the body,
  (e) a micro-controller physically embedded into the body for controlling feedback from the sensor and changes in the display; and
  (f) wherein the handheld device signals one or both of the display driver and a display driver on the second device to generate one or more tangible real-world representations to facilitate the ease of communication of the information, wherein one or more of the tangible real-world representation connect and communicate with a graphical user interface of the second device.

18. The device of claim 17, wherein the device further comprises a binder, wherein the binder is used to transport more than one device and wherein the binder establishes the sequence of devices inserted into the binder.

19. The device of claim 17, further comprising a base, wherein the base allows the source of energy to be recharged, wherein the base allows the device to receive and/or transfer information with another device, wherein the base allows a sequence of the device relative to other devices to be determined.

20. The hand held device of claim 17, wherein the device uses a method for facilitating the ease of communication of information by using tangible real-world representations to indicate receipt and/or transfer of information comprising:
  (a) detecting the proximity of the hand held device relative to a second device;
  (b) determining that the proximity is sufficiently close to the second device;
  (c) indicating that the hand held device is sufficiently close to transfer the information;
  (d) transferring the information;

(e) representing the transfer with a tangible real-world representation, where the tangible real-world representation connects and communicates with a graphical user interface of the second device;
(f) disabling the hand held device from further information transfer; and
(g) indicating that the hand held device is not sufficiently close to transfer the information.

21. The hand held device of claim 17, wherein the device uses a method for facilitating the ease of communication of information by using tangible real-world representations to indicate receipt and/or transfer of information comprising:
   (a) means for detecting the proximity of the hand held device relative to a second device;
   (b) means for determining that the proximity is sufficiently close to the second device;
   (c) means for indicating that the hand held device is sufficiently close to transfer the information;
   (d) means for transferring the information;
   (e) means for representing the transfer with a tangible real-world representation, where the tangible real-world presentation connects and communicates with a graphical user interface of the second device;
   (f) means for disabling the hand held device from further information transfer; and
   (g) means for indicating that the hand held device is not sufficiently close to transfer the information.

22. The method of claim 21, wherein the method is carried out using a system or hand held device for facilitating ease of communication of information using tangible real-world representations to indicate handling and transfer of information to and from a second device, which comprises:
   (a) one or more processors capable of using tangible real-world representations and representations to receive information; capable of detecting the proximity of the hand held device relative to the second device; capable of indicating the hand held device is ready to enable information transfer; capable of initiating information transfer using tangible real-world representations to transfer information; capable of disabling the hand held device from further information transfer; and
   (b) a machine readable medium including operations stored thereon that when processed by one or more processors cause a system to perform the steps of using tangible real-world representations to receive information; detecting the proximity of the hand held device relative to one of a person, the second device or a hand held device; indicating the hand held device is ready to enable information transfer, initiating information transfer using tangible real-world representations to transfer information; disabling the hand held device from further information transfer.

23. A machine-readable medium having instructions stored thereon to cause a system to:
   detect proximity of a hand held device relative to a second device;
   determine that proximity of the hand held device is sufficiently close to the second device;
   indicate that the hand held device is sufficiently close to transfer information;
   transfer the information;
   represent the transfer with tangible real-world representation, where one or both of the hand held device and the second device use one or more tangible real-world representation to connect and communicate with a graphical user interface of the second device;
   disable the hand held device from further information transfer; and
   indicate that the hand held device is not sufficiently close to transfer the information.

* * * * *